(12) United States Patent
Hettinger et al.

(10) Patent No.: US 9,244,465 B2
(45) Date of Patent: Jan. 26, 2016

(54) METERING SYSTEM, HOUSING PART FOR A METERING UNIT AND METERING UNIT

(71) Applicant: Buerkert Werke GmbH, Ingelfingen (DE)

(72) Inventors: Christoph Hettinger, Ingelfingen (DE); Fabian Mittnacht, Igersheim (DE)

(73) Assignee: Buerkert Werke GmbH, Ingelfingen (DE)

( * ) Notice: Subject to any disclaimer, the term of this patent is extended or adjusted under 35 U.S.C. 154(b) by 0 days.

(21) Appl. No.: 14/196,485

(22) Filed: Mar. 4, 2014

(65) Prior Publication Data

US 2014/0251450 A1    Sep. 11, 2014

(30) Foreign Application Priority Data

Mar. 11, 2013 (DE) .......... 10 2013 102 397

(51) Int. Cl.
| | |
|---|---|
| *B65D 37/00* | (2006.01) |
| *G05D 7/01* | (2006.01) |
| *F04B 13/00* | (2006.01) |
| *F04B 43/073* | (2006.01) |
| *F04B 7/02* | (2006.01) |

(52) U.S. Cl.
CPC  *G05D 7/01* (2013.01); *F04B 13/00* (2013.01); *F04B 43/073* (2013.01); *F04B 7/02* (2013.01); *Y10T 137/598* (2015.04)

(58) Field of Classification Search
CPC .......... F04B 13/00; F04B 43/00; F04B 43/02; F04B 43/073; F04B 43/0736; F04B 45/04; F04B 45/041; F04B 45/043; F04B 45/045; F04B 45/053; F04B 53/109; F04B 7/02; F04B 7/0208; F04B 19/006; F04B 43/021; F04B 4/025; F04B 43/06; G05D 7/01; Y10T 137/59
USPC ........... 137/315.01; 141/127; 417/395, 413.1, 417/479, 521; 222/207, 209, 214, 309, 333, 222/334, 434, 440, 447, 450, 504
See application file for complete search history.

(56) References Cited

U.S. PATENT DOCUMENTS

| | | | | |
|---|---|---|---|---|
| 5,344,292 | A  * | 9/1994 | Rabenau et al. | ........... 417/413.1 |
| 8,029,249 | B2 * | 10/2011 | Jochumsen et al. | .......... 417/310 |
| 8,273,049 | B2 * | 9/2012 | Demers et al. | ............... 604/6.11 |
| 2005/0196302 | A1 * | 9/2005 | Huang | ........................... 417/412 |
| 2008/0077068 | A1 * | 3/2008 | Orr | .............................. 604/6.11 |
| 2009/0159830 | A1 * | 6/2009 | Chen et al. | .................... 251/356 |
| 2013/0277394 | A1 * | 10/2013 | Edwards | .................... 222/144.5 |

* cited by examiner

*Primary Examiner* — Frederick C Nicolas
*Assistant Examiner* — Bob Zadeh
(74) *Attorney, Agent, or Firm* — Hauptman Ham, LLP

(57) ABSTRACT

A metering system for metering a metering fluid includes at least one metering unit, a fluid supply component conveying the metering fluid to the metering unit, and a control module conveying a control fluid to the metering unit. The metering unit includes a first housing part, an exchangeable second housing part and a membrane which is arranged between the housing parts and divides a cavity formed between the housing parts into a pumping chamber and a metering chamber which are separated from each other in fluidic terms. Channels are formed in the first housing part which receive the control fluid and are in flow connection with the control module, and channels are formed in the second housing part which receive the metering fluid and are in flow connection with the fluid supply component.

19 Claims, 8 Drawing Sheets

METERING SYSTEM, HOUSING PART FOR A METERING UNIT AND METERING UNIT

CROSS REFERENCE TO RELATED APPLICATION

This application claims the priority of German Patent Application No. 10 2013 102 397.5, filed on Mar. 11, 2013 in the European Intellectual Property Office, the disclosure of which is incorporated herein in its entirety by reference.

FIELD OF THE INVENTION

The invention relates to a metering system for metering a metering fluid as well as to an exchangeable housing part for a metering unit and an exchangeable metering unit of a metering system.

BACKGROUND

For the purpose of precisely metering extremely high-quality media, for example in the pharmaceutical sector, elaborate and costly metering systems are usually employed which have to be cleaned and sterilized after the end of the process with high effort. This is profitable above all for larger sample quantities. In the processing of smaller quantities, however, this represents an undesired cost factor. This is why it is preferred to use disposable components for the metering of smaller media quantities, which can be changed after each run.

A metering unit of this type is described in DE 20 2012 003 948 U1. In the metering unit which is illustrated there, air as a control fluid is alternately blown into a pumping chamber and sucked out of it, so that a membrane is moved between two end positions and hence the volume of a metering chamber opposite the pumping chamber increases and decreases. This results in a membrane pump by means of which the metering fluid can be dosed in very precise quantities. The metering chamber which is shown there has its inlet and outlet sides fluidly connected to or separated from an inlet and outlet through a membrane valve each. The process of controlling the membrane valves is carried out, for example, by means of a pneumatic valve controlling the pressurization of the membrane on the part of the pumping chamber.

It is the object of the invention to provide a metering system which allows an extremely precise metering of a defined media quantity, with that part of the system which is in contact with the media being easily exchangeable and having such a simple construction that it can be produced at low cost and thus be designed as a disposable part.

SUMMARY

The invention provides a metering system for metering a metering fluid, comprising at least one metering unit, a fluid supply component conveying the metering fluid to the metering unit, and a control module conveying a control fluid to the metering unit. The metering unit comprises a first housing part, a second housing part and a membrane which is arranged between the housing parts and divides a cavity formed between the housing parts into a pumping chamber and a metering chamber which are separated from each other in fluidic terms. There are channels formed in the first housing part which receive the control fluid and are in flow connection with the control module, and there are channels formed in the second housing part which receive the metering fluid and are in flow connection with the fluid supply component. The second housing part is detachably connected to both the first housing part and the fluid supply component or is undetachably connected to the first housing part and detachably connected to the fluid supply component. The second housing part is detachably connected to both the first housing part and the fluid supply component, in particular in form-locking fashion.

The metering fluid may flow exclusively in the fluid supply component and in the second housing part, but not in the rest of the metering system.

If the metering system has to be prepared for the next run after the completion of a process, it is only necessary to exchange the second housing part(s) and possibly the fluid supply component.

The membrane is connected to the second housing part e.g. in fixed manner and is exchanged together with it, as it is known in prior art. Due to the detachable and form-locking connections by means of which the second housing part and advantageously also the fluid supply component are fastened in the system, this exchanging operation can be done in an easy manner and within short time.

As an alternative, the entire metering unit can be designed as a disposable part and completely exchanged as a unit. In this case, the two housing parts can be connected to each other e.g. in the form of a material bond and so that they cannot be detached in a non-destructive manner. The membrane can be simply placed between the first and second housing parts and will be fixed during connecting the housing parts.

Preferably, the second housing part is coupled to the first housing part and the fluid supply component via form-locking connections, so that it can be detached from the metering system in a few simple manual operations and replaced by a new second housing part or a new metering unit. The parts will instantly be in the correct mutual position and alignment. It is preferred that the process of connecting is carried out exclusively by use of form-locking connections.

The fluid supply component can have only few lines with a cross-section which is as large as possible, so that cleaning and sterilizing are readily possible. It is possible to manufacture also the fluid supply component either as a replacement part or as a disposable part and to replace it e.g. for every process run.

Both the second housing part and the fluid supply component may have a geometric design which is as simple as possible, so that their manufacture can be realized in a low-cost injection-molding process.

According to one embodiment, a single, elongated fluid supply component is provided in the metering system, whereas a larger number of individual metering units arranged side by side are fluidly connected to the common fluid supply component and/or to the common control module, for instance by arranging all metering units side by side on the fluid supply component.

In the metering unit and e.g. next to the metering chamber, an inlet chamber and an outlet chamber are provided in the second housing part, through which the metering fluid flows into the metering chamber or flows out from the metering unit.

Each of the metering units comprises only one single unit made up of an inlet chamber, an outlet chamber and one or more metering chambers which are in flow connection therewith as well as the corresponding pumping and control chambers. This allows to keep the second housing parts and the metering units small in size, reducing the manufacturing expense especially with respect to precise dimensions.

The first housing part as well as the control module may have a more complex construction, as these parts never come into contact with the metering fluid and thus neither have to be regularly cleaned nor exchanged after each process run.

The form-locking connections can be formed as a plug-in connection in each case. This allows to completely avoid screw connections or connections with other loose fastening elements which are elaborate in terms of disengaging and establishing them.

The plug-in connection between the housing parts is e.g. formed in that plug-in protrusions are provided on one of the housing parts and engage matching recesses on the other housing part. The plug-in protrusions may be formed on the second housing part and the recesses, for instance in the form of apertures, may be formed on the first housing part.

For the connection to the fluid supply component, the second housing part can be provided with a feeder nozzle engaging a port on the fluid supply component. The feeder nozzle and the port are necessary in any case in order to convey the metering fluid from the fluid supply component to the metering chamber in the second housing part. In this case, these components at the same time have such a geometric design that they also establish a form-locking connection between the second housing part and the fluid supply component and allow an exact positioning of these two components relative to each other.

The plug-in protrusions as well as the conduction nozzle are integrally formed on the second housing part e.g. during the injection-molding process.

If a modular construction is to be achieved, allowing to exchange individual components of the metering system in the most straightforward manner, it is of advantage to also connect the first housing part and the control module in detachable and form-locking fashion to each other. Here, again a plug-in connection may be used, for instance, perhaps by control line nozzles on the first housing part, via which the control fluid is conveyed to the pumping chamber or to membrane valves for controlling the metering unit and which engage ports in the control module.

These control line nozzles can also be integrally formed on the first housing part in an easy way during the injection-molding process.

In order to be able to assemble the metering system in an easy manner, a carrier part can be provided which is detachably connected to the fluid supply component in form-locking fashion. As the fluid supply component is e.g. designed as a changeable or disposable part, it is reasonable to use a separate, reusable carrier part to which the fluid supply component and hence the metering units can be mounted in advance.

In order to realize the form-locking and detachable connection, retaining structures may be provided on the fluid supply component and/or on the carrier part, said retaining structures fixing the fluid supply component on the carrier part in at least one spatial direction, in particular perpendicular to the axial direction of the fluid supply component and perpendicular to an axis extending through the fluid supply component and the metering unit. Unlike the form-locking connections between the second housing part and the first housing part or the fluid supply component and also in contrast to the form-locking connections of the first housing part with the control module, which can all be established and disengaged preferably perpendicular to the axial direction of the fluid supply component (which may also correspond to the axial direction of the entire metering system), the connection to the carrier part is fixed in exactly this spatial direction. Thus, disengaging and establishing the connection between the carrier part and the fluid supply component occurs in a spatial direction which is perpendicular to the direction in which the other form-locking connections are disengaged and established. In this way, an inadvertent disengagement can be prevented.

It is possible that the retaining structures are simple recesses or undercuts in the carrier part and in the fluid supply component. They should be formed such that they allow the fluid supply component to be pushed laterally into the carrier part, for example by protrusions of the carrier part engaging the undercuts in the fluid supply component or vice versa.

The carrier part is connected to a pressing mechanism by means of which the control module, the at least one metering unit, the fluid supply component and the carrier part are kept together under compressive force. In doing so, the fluid supply component and the at least one metering unit are preferably sandwiched between the carrier part and the control unit. The pressing mechanism may comprise a displacement mechanism, for instance, which moves the carrier part—together with the components which have been pre-assembled thereon—toward the control module. It is also possible to use clips with which the carrier part is braced on the control module or on a component receiving the control module. This results in a force which acts perpendicularly to the components of the metering system, i.e. the control module, the metering unit and the fluid supply component. Said force compresses the form-locking connections between these components in the closing direction and hence fixes the components of the metering system to one another.

It is possible that the entire metering system is only plugged together and connected in form-locking fashion (or by frictional force or with a material bond). Apart from the described form-locking connections, e.g. the plug-in connections, no further fastening elements are required, except for the pressing mechanism which presses the carrier part against the control module.

It goes without saying that sealing elements are e.g. arranged between the control module and the first housing part as well as between the second housing part and the fluid supply component, in order to seal off the control fluid and metering fluid ports.

The fluid supply component comprises at least one protrusion resting against the control module. In this way, the fluid supply component can be immediately supported by the control module. This avoids that any force, exerted in particular by the pressing mechanism and keeping the metering system together, transmits a force to the metering unit which acts perpendicular to the latter. In some cases, this might cause a deformation which could affect the metering quantity. Due to preventing any force from acting on the metering unit, the precision of the metering is increased.

The protrusion protrudes from the fluid supply component. Preferably, the protrusion rests against an underside of the control module directed toward the metering unit.

The protrusion may penetrate an opening in the metering unit.

In the simplest case, one or more protrusions are provided so as to extend perpendicularly from the fluid supply component, which e.g. have a length which is equal to the thickness of the metering unit. The important point is that the space between the control module and the fluid supply component is slightly larger at every point than the extension of the metering unit in this direction, so that no forces act on the metering unit which are capable of deforming it.

The protrusion is arranged and dimensioned such that, according to one option, no excessive force is exerted by the fluid supply component and the control module on the metering unit. Of course, the metering unit is clamped between the control module and the fluid supply component with such a high force that it is firmly fixed in its position and its fluid ports are leak-proof.

In the area of the at least one metering unit, e.g. several protrusions are formed in order to achieve a reliable positioning and a good load distribution even in case of a larger pressing force. In this way, the protrusions may also support the especially form-locking connection of the housing parts and the entire metering unit with the fluid supply component.

It is also conceivable to reverse the flow direction of the metering fluids, so that the metering fluid flows out through the fluid supply component. In this case, the latter may receive the dosed quantities of metering fluid from all metering units and direct them to a common fluid outlet.

The invention further provides an exchangeable housing part, e.g. of a metering unit according to the present invention. The housing part comprises a plate-shaped base body, with at least one metering chamber as well as exactly one inlet chamber and exactly one outlet chamber being provided on a fluid side, and a membrane being fastened to the base body and overlapping the metering chamber, the inlet chamber and the outlet chamber. With this arrangement, it corresponds e.g. to a second housing part described above, having a membrane fastened to it.

The metering chamber, the inlet chamber and the outlet chamber can be designed as indentations in the fluid side.

The inlet chamber and/or the outlet chamber may be designed essentially as annular indentations and surround an inlet and outlet nozzle having central inlet and outlet openings whose edges are situated substantially at the level of the fluid-sided plate face of the base body.

At least one overflow channel is provided between the inlet chamber and the metering chamber and/or between the metering chamber and the outlet chamber and is designed as an indentation in the fluid-sided plate face of the base body.

In one embodiment, the overflow channel is divided into several adjacent channels which are separated from one another in each case by a narrow partition wall which is continuous e.g. in the longitudinal direction.

The partition walls may extend up to the fluid-sided plate face of the base body and support the membrane. In this way, the free motion of the membrane is restricted and the metering accuracy is increased.

In a center area of the metering chamber, a throughflow channel may be formed which is divided into several adjacent channels which each are separated from one another by a narrow, continuous partition wall which extends in particular substantially up to the level of the fluid-sided plate face.

The base body can be provided with several plug-in protrusions which protrude from the fluid side and are intended to engage corresponding recesses on another housing part of the metering unit.

The outlet opening is in flow connection e.g. with an outlet nozzle protruding perpendicularly from an external side of the base body.

Openings may be provided between the plug-in protrusions, said openings being intended for being penetrated by protrusions of a fluid supply component of the metering system.

The inlet and outlet chambers may be arranged so as to be aligned with the metering chamber, with the inlet chamber being arranged upstream the metering chamber and the outlet chamber being arranged downstream the metering chamber; in this way, it is easy to arrange a large number of individual metering units side by side in the metering system.

It is also possible, however, to move the inlet chamber and/or the outlet chamber away from the axis of the metering chamber and to arrange beside the metering chamber, with the option to arrange the two chambers on the same side of the metering chamber or on opposite sides. Such an arrangement is appropriate if installation space is to be saved in the axial direction.

In a variant, the second housing part is provided with at least two metering chambers which are fluidly connected to the inlet chamber and the outlet chamber. In this case, the first housing part correspondingly comprises two pumping chambers by which the two metering chambers can be actuated independently of each other. The metering chambers may have differing volumes. Having a metering unit with two chambers, it is possible to provide three different volumes of metering fluid according to demand, depending on whether only the first, only the second or both metering chambers are filled.

It is of advantage if the metering chamber, the inlet chamber, the outlet chamber, the pumping chamber and/or the control chambers, as seen in cross-section perpendicular to the axial direction of the base body and the metering unit, have an S-shaped profile, so that the edge of all the chambers in the first and second housing parts peter out opposite the fluid surface outside the chambers in shallow manner, as in this case the membrane is able to have an optimum contact on the chambers even with low control pressures. The tangent of the chamber contour at the transition to the face preferably approaches the fluid face and hence the parting plane of the two housing parts.

The invention also relates to a metering unit, e.g. for a metering system according to the present invention, comprising a first housing part, a second housing part and a membrane which is arranged between the housing parts and divides a cavity between the housing parts in fluid-tight manner into a pumping chamber and a metering chamber, the membrane being situated between the housing parts and the two housing parts being undetachably connected to each other. The metering unit can be exchanged as a whole and is preferably designed as a disposable part. Here, the membrane is at first not directly connected to the second housing part in fixed manner, but is placed between the housing parts during assembly of the metering unit and will be fixed in the course of connecting the housing parts to each other. The control fluid and the metering fluid will always be kept separate from each other in the metering unit. Here, the housing parts are connected to each other so as to result in an undetachable connection, i.e. a connection which can only be disconnected in a destructive manner, such as by gluing or welding.

A candidate for the second housing part is e.g. a second housing part as described above.

DETAILED DESCRIPTION

Figure 1:
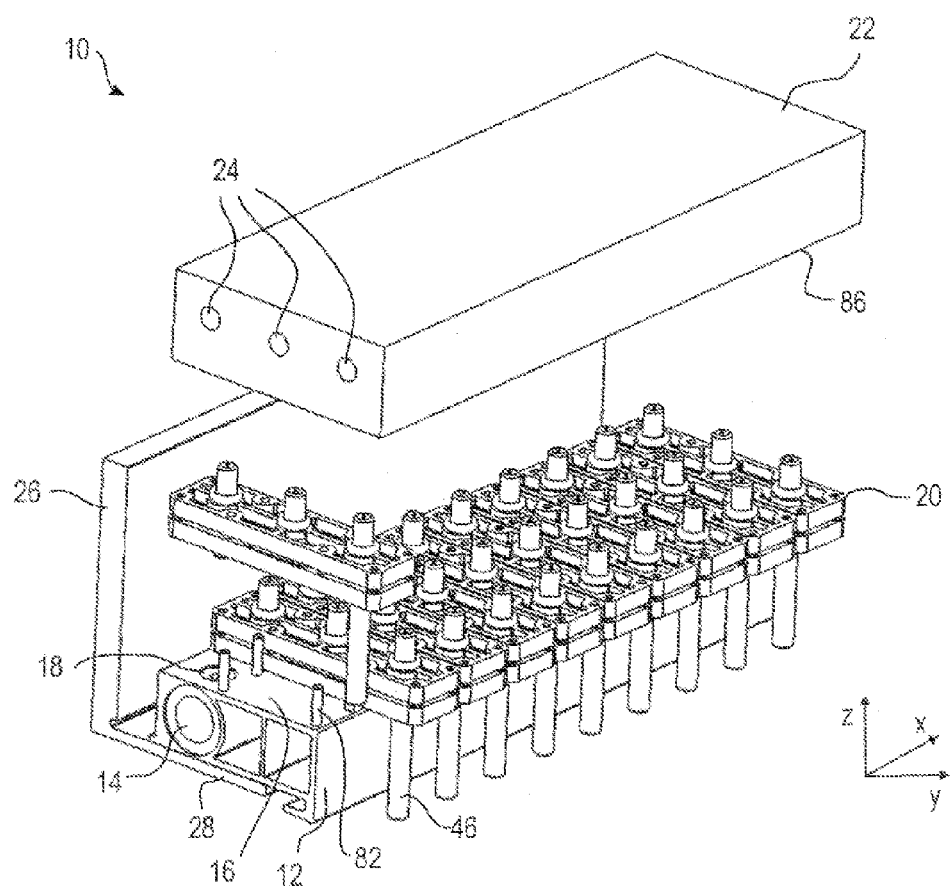
FIG. 1 is a schematic perspective illustration of a metering system according to the invention in a partially assembled state.
Figure 2:
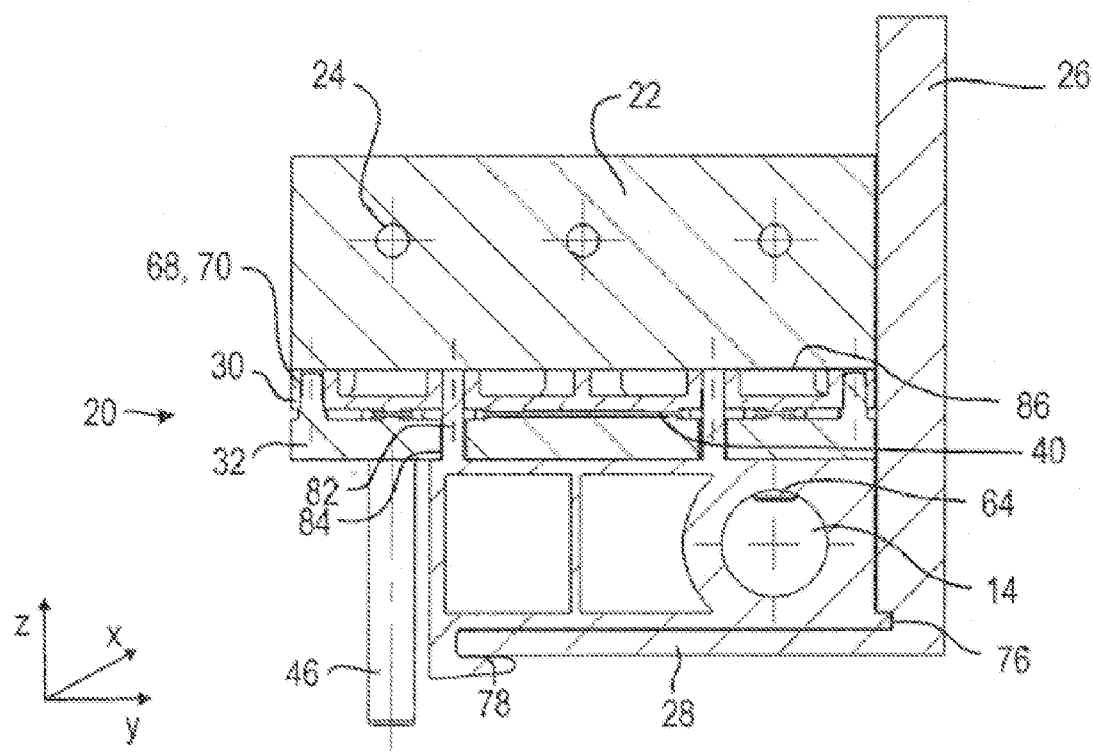
FIG. 2 is a schematic sectional view of the metering system of FIG. 1 in a first plane.

FIG. 1 shows a metering system 10, which allows among other things the metering of valuable metering fluids, for instance in the pharmaceutical sector, where the dose size can be e.g. in the range of microliters up to a few milliliters.

The metering fluid to be dosed is supplied through an elongated, here box-shaped fluid supply component 12 which in this example comprises a single supply channel 14 extending in axial direction x longitudinally through the fluid supply component 12, with a flow of the metering fluid entering said channel.

As an alternative, the metering system 10 may also be operated in reversed flow direction, wherein any metering fluid which has been dosed is discharged into the fluid supply component 12.

At regular intervals, the fluid supply component 12 has its upper side 16 provided with ports 18 providing a flow connection to the channel 14.

A series of separate metering units 20 are placed side by side on the upper side of the fluid supply component 12 in axial direction x. This example shows ten metering units 20, but it is also possible to choose a higher or smaller number of them. Each of the metering units 20 handles a metering fluid or a single metering fluid and doses it in exactly predefined quantities.

The actuation of the metering units 20 is carried out through a control module 22 which is arranged in the Figures above the metering units 20. In the present case, the control module 22 is supplied with a control fluid, for instance air, via three control channels 24.

Further, a carrier part 26 is provided which is designed here in the form of an L-shaped frame whose lower leg 28 (with respect to the Figures) engages a groove in the fluid supply component 12 and, on the other hand, a protrusion on the opposite end of the fluid supply component 12 is inserted into a groove in the corner area of the carrier part 26. In this way, the assembly unit made up of the fluid supply component 12 and the metering units 20 is accommodated in the carrier part 26. By means of the carrier part 26, this assembly unit may then be pushed upward in direction z in the Figures toward the control module 22 which is in fixed position in most cases and can be pressed against it.

Figure 5:
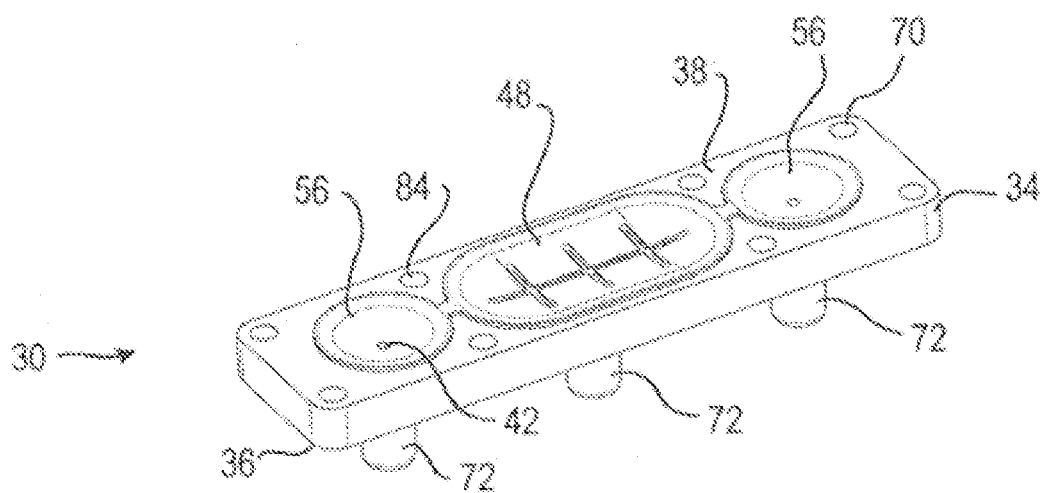
FIG. 5 is a schematic perspective view of a first housing part of the metering system of FIG. 1.

Each of the metering units 20 consists of a first housing part 30 and a second housing part 32. Both housing parts 30, 32 have a substantially plate-shaped base body 34 comprising an external side 36 as well as an oppositely oriented fluid side 38 (see FIGS. 5 and 6).

Figure 3:
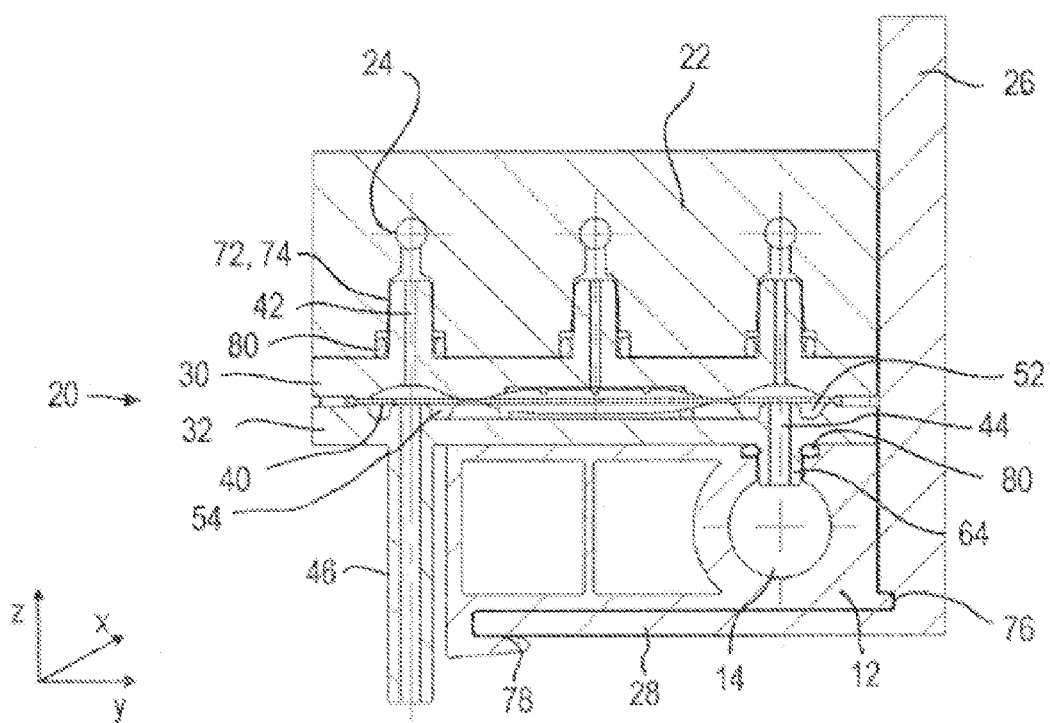
FIG. 3 is a schematic sectional view of the metering system of FIG. 1 in a second plane.
Figure 4:
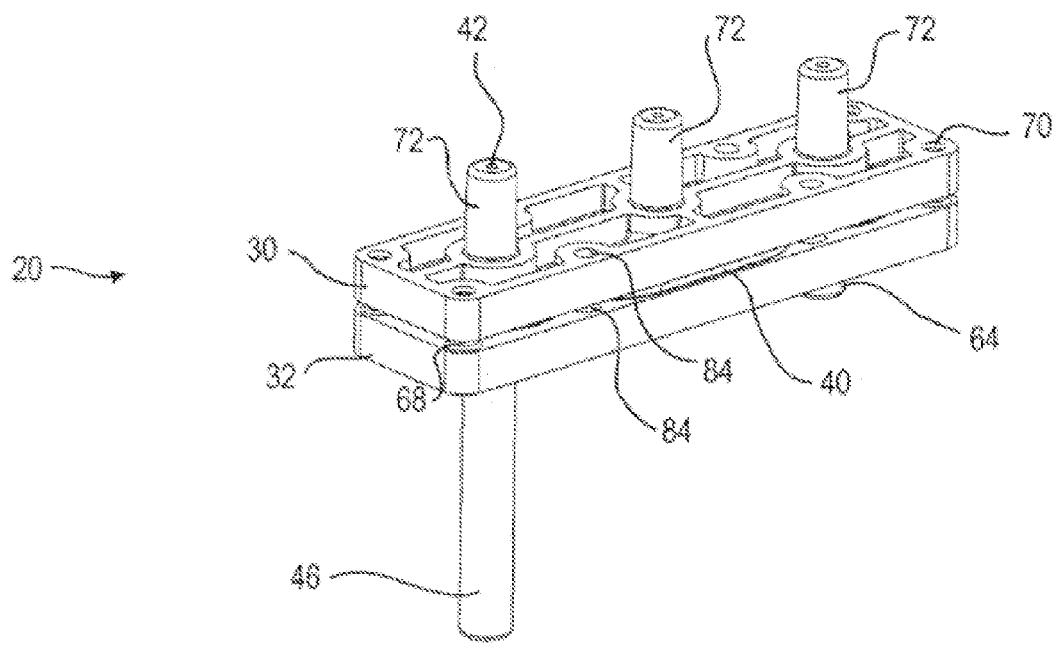
FIG. 4 is a schematic perspective view of a metering unit of the metering system of FIG. 1.

The two fluid sides 38 face each other in the assembled metering unit 20, and a membrane 40 is arranged between the base bodies 34 of the housing parts 30, 32 (see for instance FIG. 3). Here, the membrane 40 is firmly connected to the second housing part 32.

The first housing part 30 is provided with channels 42, here three in each case, which are in flow connection with the control channels 24 of the control module 22.

The second housing part 32 comprises a channel 44 leading to the metering fluid supply line and being in flow connection with the channel 14 in the fluid supply component 12 or with a separate feed line to its metering fluid. In addition, the second housing part 32 is provided with a channel in a nozzle 46 which leads out of the metering system 10 and allows each of the metering units 20 to discharge a precisely metered amount of the metering fluid. In the reverse case, the nozzle 46 may also serve as an inflow nozzle.

Three cavities are formed in each of the two housing parts 30, 32. If the fluid sides 38 of the two housing parts 30, 32 make contact with each other in the readily assembled metering unit 20, three cavities will be produced which are each divided by the membrane 40 which in the present case extends in one piece through all the cavities. The central cavity with respect to the Figures forms a pumping chamber 48 in the first housing part 30 and a metering chamber 50 in the second housing part 32.

The two other cavities form an inlet chamber 52 or an outlet chamber 54 in the second housing part 32 as well as a control chamber 56 in the first housing part 30 in each case, with the option that the inlet and outlet chambers 52, 54 may also be interchanged.

The inlet chamber 52 and the outlet chamber 54 are arranged here on a straight line with the metering chamber 50, with the metering chamber 50 being arranged between the inlet chamber 52 and the outlet chamber 54.

Instead of only one metering chamber 50, it would also be possible to provide several metering chambers which are arranged in series or in parallel between the inlet chamber 52 and the outlet chamber 54. The geometrical arrangement of the chambers on the fluid side 38 can be selected depending on the respective requirements. Correspondingly, several pumping chambers 48 would then be arranged in the first housing part, which are individually actuated by the control module 22 analogous to the described pumping chamber 48 (see also FIGS. 7 and 8).

It would also be possible to form the metering chamber 50, the inlet chamber 52 and/or the outlet chamber 54 entirely by the volume of the pumping chamber 48 or of the control chambers 56, so that the fluid side 38 of the base body 34 is substantially planar. In this case, the chambers are defined by the corresponding areas between the base body 34 and the membrane 40.

The two fluid systems of the control fluid and of the metering fluid are completely separated from each other by the membrane 40.

Any metering fluid comes into contact only with the channel 14 of the fluid supply component 12 as well as with the chambers and channels of the second housing part 32.

Upon completion of a process and in preparation of the next process, it will thus be sufficient to exchange all second housing parts 32 of the metering system 10 and possibly the fluid supply component 12, whereas all other components may continue to be used.

Alternatively, even the complete metering unit 20 can be exchanged. In a variant, the first and second housing parts 30, 32 are undetachably connected to each other, e.g. are glued or welded to each other, so that the metering unit 20 by itself forms an exchangeable unit.

A vacuum is produced or pressure is applied in the pumping chamber 48 as well as in the two control chambers 56 of the first housing part 30 via the control module 22. Three individually addressable control valves, e.g. pneumatic valves, may be provided in the control module 22 for each of the metering units 20, so that the pumping chamber 48 and the two control chambers 56 can be operated independently of one another. The motion of the membrane 40 which is brought about by the control fluid causes a metered pumping motion of the metering fluid by a change in the volume of the metering chamber 50 due to clearing or blocking an inlet opening 58 or an outlet opening 60 in the second housing part 32. Here too: the inlet and outlet openings 58, 60 will swap depending on whether dosed metering fluids flow into the channel 14, for example in order to produce a precisely dosed fluid mix, or metering fluid is extracted.

Figure 6:
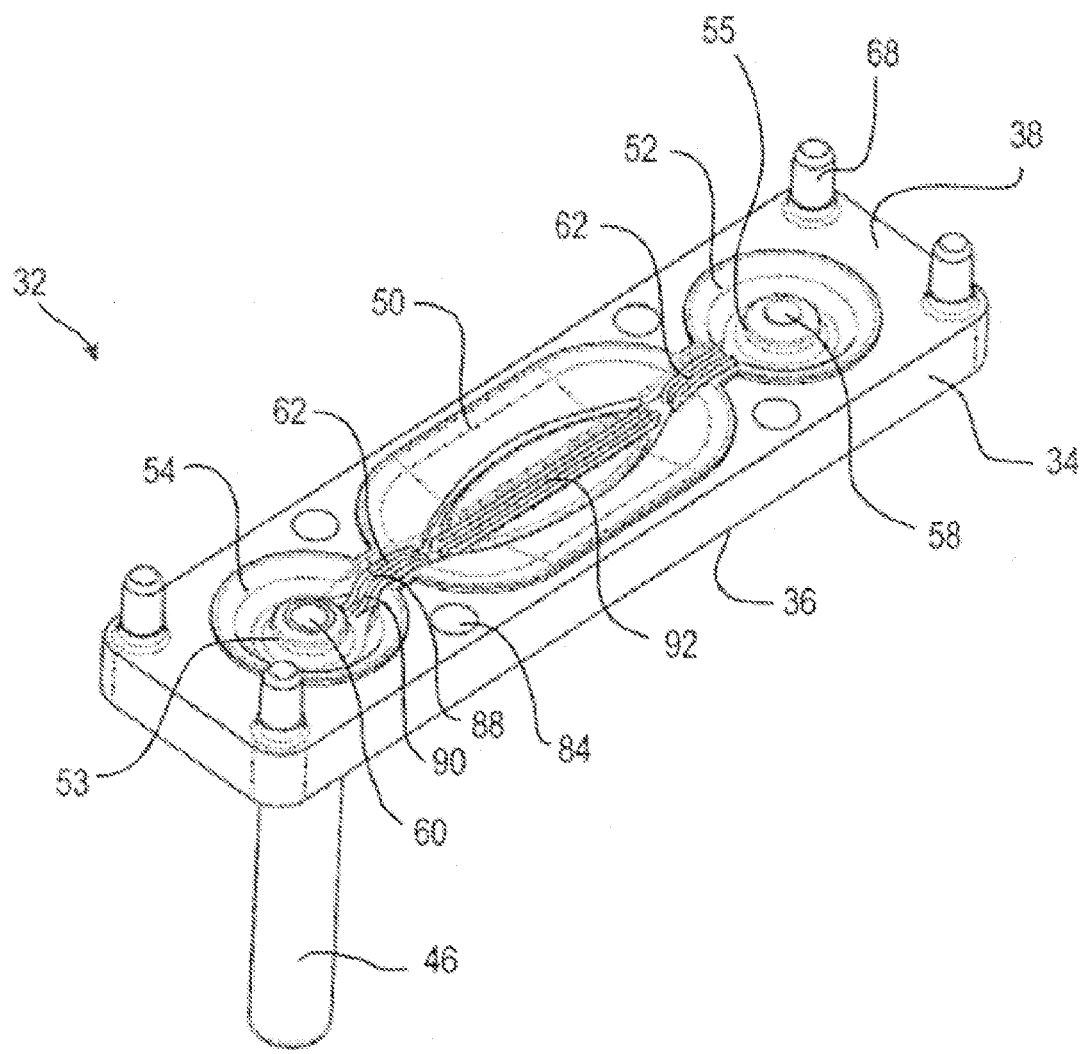
FIG. 6 is a schematic perspective view of a second housing part of the metering system of FIG. 1.

In the embodiment shown in FIG. 6, the inlet chamber 52 and the outlet chamber 54 are formed as annular indentations. An inlet nozzle 53 and an outlet nozzle 55, having its free ends provided with a central inlet and outlet opening 58, 60, respectively, projects like an "island" which is surrounded by the respective indentation; the end face surrounding the respective inlet and outlet openings 58, 60, forms a sort of valve seat. This valve seat is preferably situated on the plate face, so that the membrane can rest on this valve seat in an initial state in order to close the corresponding opening 58, 60.

For the purpose of carrying out a metering stroke, applying a vacuum in the control chamber 56 associated to the inlet chamber 52 will cause the membrane 40 to be lifted upward in this area, so that the metering fluid can flow into the annular inlet chamber 52 from the channel 14 via the channel 44 in a feeder nozzle 64 through the inlet opening 58 or, in the reverse case, may reach the inlet chamber 52 via the nozzle 46.

If the membrane 40 will also be lifted in the area of the metering chamber 50 due to applying a vacuum in the pumping chamber 48, the metering fluid flows through an overflow channel 62 between the inlet chamber 52 and the metering chamber 50 into the metering chamber 50 and fills it.

If the desired volume of the metering fluid has flown into the metering chamber 50, the membrane 40 in the inlet chamber 52 will be moved backwards by making control fluid flow into the associated control chamber 56. As a result, the inlet opening 58 will be closed. By means of lifting the membrane 40 in the outlet chamber 54 due to applying a vacuum in the corresponding control chamber 56, the outlet opening 60 is cleared and the metering fluid flows from the metering chamber 50 via a second overflow channel 62 into the outlet chamber 54 and from there through the outlet nozzle 46 out of the metering system 10.

The feeder nozzle 64 extends from the external side 36 of the housing part 32 opposite the fluid side 38 perpendicular to the second housing part 32 and projects through one of the ports 18 in the fluid supply component 12 into its channel 14.

With reversed flow direction, the metering fluid is supplied through the nozzle 46 via the opening 60, which now forms the inlet opening, to the chamber 54 now serving as the inlet chamber. The dosing process carried out by the metering chamber 50 is performed as described above. However, the metering fluid leaves the metering unit 20 via the chamber 52 (now the outlet chamber) and the opening 58 which forms the outlet opening now, and flows via the nozzle 64, which is a discharge nozzle now, into the channel 14 of the fluid supply component 12.

Apart from establishing the flow connection for the metering fluid, the engagement of the feeder nozzle 64 in the port 18 also serves the purpose to provide a form-locking but detachable plug-in connection between the second housing part 32 and the fluid supply component 12, fixing the second housing part 32 and the fluid supply component 12 to each other. The second housing part 32 is connected to the fluid supply component 12 via the feeder nozzle 64.

The second housing part 32 further comprises four pin-shaped plug-in protrusions 68 which are arranged at its corners, protrude from the fluid side 38 and project toward the first housing part 30 (see FIG. 6). Provided in the first housing part 30 are matching continuous recesses 70, so that the two housing parts 30, 32 can be plugged onto each other without any clearance in form-locking fashion (see FIG. 5). In this example, the two housing parts 30, 32 are connected to each other by means of the form-locking plug-in connection of the plug-in protrusions 68 engaging the recesses 70. Here, the housing parts 30, 32 are detachably attached to each other, but they could also be connected to each other in undetachable fashion, e.g. by gluing or welding.

The three channels 42 for control fluid, one in each of the feeder nozzles 72, are formed on the first housing part 30. These feeder nozzles extend perpendicularly from the external side 36 of the housing part 30 opposite the fluid side 38 and engage a matching seat 74 in the control module 22 (see FIG. 3). The first housing part 30 is detachably connected to the control module 22 via the three feeder nozzles 72 in a form-locking fashion.

All these plug-in connections are established and disengaged in one direction, here direction z, in which the components of the metering system 10 lie on top of each other (see FIG. 1).

The carrier part 26, however, is connected to the fluid supply component 12 in such a manner that a detachable and form-locking plug-in connection is produced which can be disengaged and established through a lateral movement relative to the components in direction y and hence perpendicular to the direction z. To this end, grooves or undercuts 76, 78 are formed in the carrier part 26 and in the fluid supply component 12, allowing these components to be pushed into each other in direction y. The undercuts 76, 78 are realized here in the form of structures which extend along the entire length of the fluid supply component 12 in direction x.

All components of the metering system 10 are connected to each other solely via form-locking plug-in connections. Any other fastening means such as e.g. screws are not provided in this example.

For assembly, the individual metering units 20 are plugged into the fluid supply component 12 and the latter is pushed onto the carrier part 26. This assembly unit will then be attached to the control module 22 in direction z from bottom to top.

A pressing mechanism which is not illustrated here, for instance in the form of a displacement mechanism, presses the carrier part 26 against the control module 22 or a support of the control module 22. The pressing mechanism exerts a force which is sufficiently high so that the components of the metering system 10 are kept together in leak-proof and firm manner.

Seals 80 are provided between the individual components, for instance in the form of conventional O-rings. The seals 80 are provided, for example, between the feeder nozzles 72 and the control module 22 and the seats 74 as well as between the port 18 in the fluid supply component 12 and the feeder nozzle 64 of the second housing part 32, in order to seal off the flow connections of the control fluid as well as of the metering fluid.

For the purpose of preventing the pressing force to be transferred to the metering units 20 and deforming them, the fluid supply component 12 comprises some pin-shaped protrusions 82 which protrude in direction z, extend through aligned openings 84 in the first and second housing parts 30, 32 and rest against the underside 86 of the control module 22. FIG. 1 shows that four protrusions 82 are provided on the fluid supply component 12 in this example for each metering unit 20. The length of the protrusions 82 is equal to the extension of the metering units 20 in direction z, so that any pressing forces which would result in a deformation of the metering unit 20 are transferred to the full extent from the protrusions 82 to the housing of the control module 22. This is why a deformation of the metering units 20 cannot occur.

The overflow channels 62 are designed such that the second housing part 32 is realized with several adjacent channels 88 which connect the inlet chamber 52 to the metering chamber 50 and the metering chamber 50 to the outlet chamber 54, these channels being separated from each other by narrow, continuous partition walls 90. It could also be possible to provide only one channel 88. Between the chambers 50, 52, 54, the partition walls 90 have the same level as the plate face of the base body 34 on the fluid side 38 outside the chambers. This has the effect that the membrane 40 rests on the partition walls 90.

In a central area of the metering chamber 50, here in the extension of the overflow channels 62, a flow-through channel 92 is formed which is also divided into several adjacent channels that are separated from each other by narrow and continuous partition walls. The channels and the partition walls of the flow-through channel 92 extend here in exact prolongation of the channels 88 and of the partition walls 90 of the overflow channels 62.

The cross-sectional profile of the metering chamber 50, the inlet chamber 52, the outlet chamber 54, the pumping chamber 48 and the control chambers 56 perpendicular to the fluid side 38 of the housing parts 30, 32 is selected here such that the inclination of the internal face reduces toward the edge, so that each chamber levels off in shallow manner into the plate face. In this way, the membrane 40 can have optimum contact on the chambers even with low control pressures.

Figure 7:
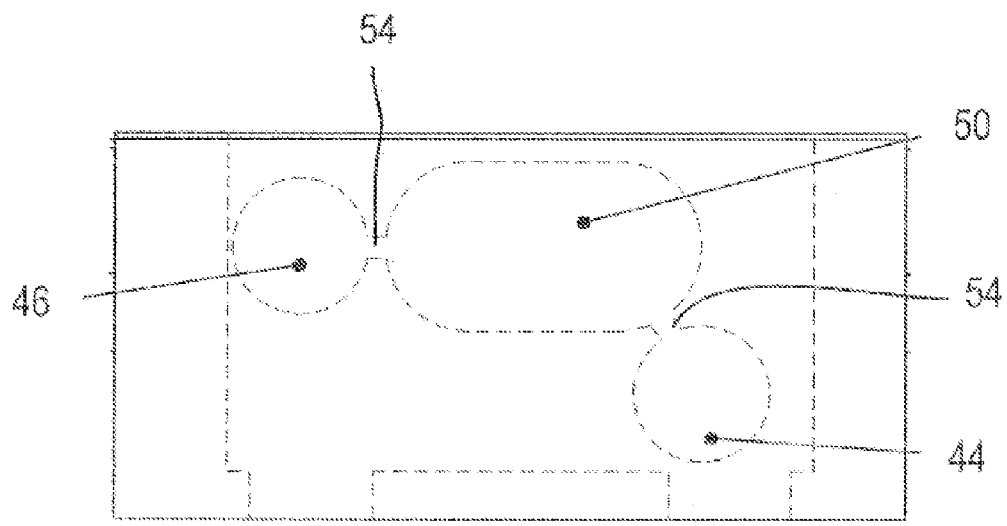
FIG. 7 is a schematic top view of a first or second housing part in a variant of a metering system according to the invention.

FIG. 7 shows an alternative arrangement of the metering chamber 50, the inlet chamber 52 and the outlet chamber 54 in the second housing part 32, or analog (mirror-inverted) of the pumping chamber 48 and the two control chambers 56 in the first housing part 30.

In the variant shown in FIGS. 1 to 6, the three chambers of each metering unit 20 are disposed on a straight line, with the metering chamber 50 being arranged between the inlet chamber 52 and the outlet chamber 54.

In the variant shown in FIG. 7, the inlet chamber 52 (or the outlet chamber 54) is arranged so as to be offset with respect to the line. It would also be possible to arrange both chambers 52, 54 beside the metering chamber 50 or to place them on a longitudinal side of the metering chamber 50 rather than on a narrow side thereof. The arrangement of the chambers 50, 52, 54 allows to take influence on the dimensions of the metering system 10.

Figure 8:
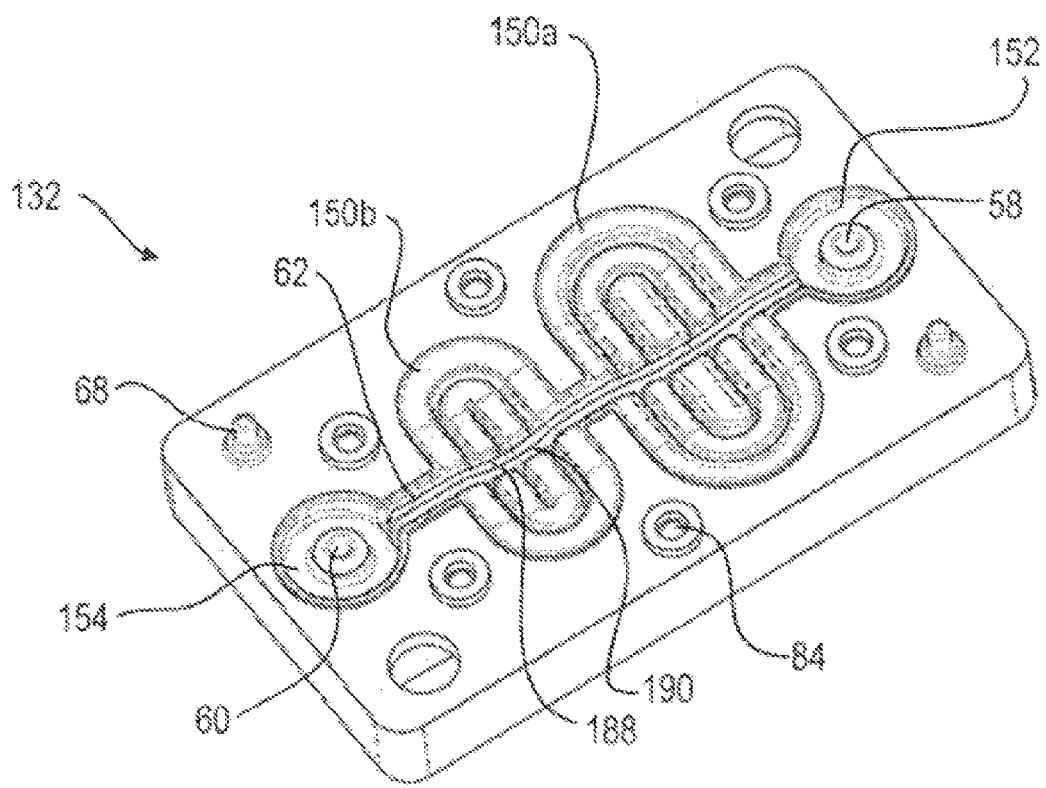
FIG. 8 is a schematic perspective view of a second housing part of a metering system of the invention according to a variant.

FIG. 8 shows a second housing part 132 of a variant of a metering unit which is not illustrated in more detail. A metering unit of this type can be used in the metering system 10 in combination with or instead of the described metering units 20.

The second housing part 132 has substantially the same construction as the second housing part 32 described above, with the difference that two metering chambers 150a, 150b are provided which each are formed as an indentation in the fluid side 38 of the base body 34. The inlet chamber 152, the first metering chamber 150a, the second metering chamber 150b and the outlet chamber 154 are fluidly connected in series to one another. An overflow channel 62 connects the inlet chamber 152 with the outlet chamber 154 and also extends continuously through both metering chambers 150a, 150b. The overflow channel 62 comprises at least one channel 188 which is limited by two partition walls 190. The partition walls 190 extend up to the plate face in particular in the metering chambers 150a, 150b.

Here, the metering chambers 150a, 150b have differing volumes. They can be individually addressed by two associated pumping chambers in a correspondingly formed first housing part. In this way, an individual metering unit is able to convey three different volumes of metering fluid.

If only the first metering chamber 150a is actuated, the delivery volume is the volume of the first metering chamber 150a. The second metering chamber 150b will not be filled, since the membrane above the second metering chamber 150b is not moved. The membrane rests on the partition walls 190, so that the metering fluid flows through the channel 188 and through the second metering chamber 150b into the outlet chamber 154.

The same applies to the actuation of only the second metering chamber 150b for the first metering chamber 150a. If both metering chambers 150a, 150b are actuated, however, the total volume of both metering chambers 150a, 150b is conveyed.

The invention claimed is:

1. A metering system for metering a metering fluid, the metering system comprising:
   a plurality of metering units, each of the plurality of the metering units including
      a first housing part having a first channel,
      a second housing part having a second channel, and
      a membrane arranged between the first housing part and the second housing part, and configured to divide a cavity formed between the first housing part and the second housing part into a pumping chamber and a metering chamber which are separated from each other;
   a fluid supply component including a single supply channel configured to convey the metering fluid to the plurality of the metering units; and
   a control module coupled with the first housing part of each of the plurality of the metering units and configured to convey a control fluid to the metering unit through the first channel,
   wherein the second housing part is
      detachably connected to both the first housing part and the fluid supply component, or
      undetachably connected to the first housing part and detachably connected to the fluid supply component.

2. The metering system according to claim 1, wherein the second housing part is detachably connected to both the first housing part and the fluid supply component by corresponding form-locking connections.

3. The metering system according to claim 2, wherein each of the form-locking connections includes a plug-in connection.

4. The metering system according to claim 3,
   wherein the second housing part further comprises a plurality of plug-in protrusions and the first housing part further comprises a plurality of recesses, and
   wherein the housing part first and the second housing part are detachably coupled with each other through the plurality of the plug-in protrusions and the plurality of the recesses.

5. The metering system according to claim 3,
   wherein the first housing part further comprises a plurality of plug-in protrusions and the second housing part further comprises a plurality of recesses, and
   wherein the first and second housing parts are detachably coupled with each other through the plurality of the plug-in protrusions and the plurality of the recesses.

6. The metering system according to claim 1, wherein the first housing part and the control module are detachably connected to each other in a form-locking fashion.

7. The metering system according to claim 1, further comprising:
a carrier part detachably connected to the fluid supply component in form-locking fashion.

8. The metering system according to claim 7, further comprising:
a retaining structure provided on at least one of the fluid supply component and the carrier part, said retaining structure retaining the fluid supply component on the carrier part in at least one spatial direction.

9. The metering system according to claim 1, wherein the fluid supply component comprises at least one protrusion resting against the control module.

10. The metering system according to claim 1, wherein the plurality of metering units are arranged side by side and are coupled to the control module and the fluid supply component.

11. An exchangeable housing part of a metering unit, the housing part comprising:
a plate-shaped base body, wherein at least one metering chamber as well as exactly one inlet chamber and exactly one outlet chamber are provided on a fluid side of the plate-shaped base body; and
a membrane which is fastened to the plate-shaped base body and overlaps the metering chamber, the inlet chamber and the outlet chamber,
wherein at least one overflow channel is designed as an indentation in a plate face of the plate-shaped base body and is provided between at least one of
the inlet chamber and the metering chamber, and
the metering chamber and the outlet chamber, wherein the overflow channel is divided into several adjacent channels which are separated from one another by a narrow partition wall which is continuous.

12. The housing part according to claim 11, wherein at least one of the inlet chamber and the outlet chamber is designed as an annular indentation with projecting inlet and outlet nozzles having central inlet and outlet openings, the edges surrounding the central inlet and outlet openings being situated substantially at a level of the plate face of the plate-shaped base body.

13. The housing part according to claim 11, wherein the partition wall ends substantially on the plate face of the plate-shaped base body.

14. The housing part according to claim 11, wherein the plate-shaped base body is provided with several plug-in protrusions which protrude from the fluid side and are configured to engage corresponding recesses on another housing part of the metering unit.

15. The housing part according to claim 14, wherein openings are provided between the plug-in protrusions, said openings being configured for being penetrated by protrusions of a fluid supply component of the metering system.

16. The housing part according to claim 11, wherein the outlet opening is in flow connection with an outlet nozzle perpendicularly protruding from an external side of the plate-shaped base body.

17. The housing part according to claim 11, wherein said at least one metering chamber comprises two metering chambers which are fluidly connected to the inlet chamber and the outlet chamber.

18. A metering system for metering a metering fluid, the metering system comprising:
a plurality of metering units, each of the plurality of the metering units including
a first housing part having a first channel,
a second housing part having a second channel, and
a membrane arranged between the first housing part and the second housing part, and configured to divide a cavity formed between the first housing part and the second housing part into a pumping chamber and a metering chamber which are separated from each other;
a fluid supply component including a single supply channel configured to convey the metering fluid to the plurality of the metering units; and
a control module coupled with the first housing part of each of the plurality of the metering units and configured to convey a control fluid to the metering unit through the first channel,
wherein the second housing part of each of the plurality of the metering units includes a nozzle configured to engage a port on the fluid supply component to provide the metering fluid to the second channel through flow connection with the single supply channel, and
wherein the second housing part is
detachably connected to both the first housing part and the fluid supply component, or
undetachably connected to the first housing part and detachably connected to the fluid supply component.

19. The metering system according to claim 18,
wherein the second housing part further comprises a plurality of plug-in protrusions and the first housing part further comprises a plurality of recesses, and
wherein the first and second housing parts are detachably coupled with each other through the plurality of the plug-in protrusions and the plurality of the recesses.

* * * * *